April 21, 1931. E. W. N. BOOSEY 1,801,262
GREASE TRAP
Filed Sept. 25, 1929 2 Sheets-Sheet 1
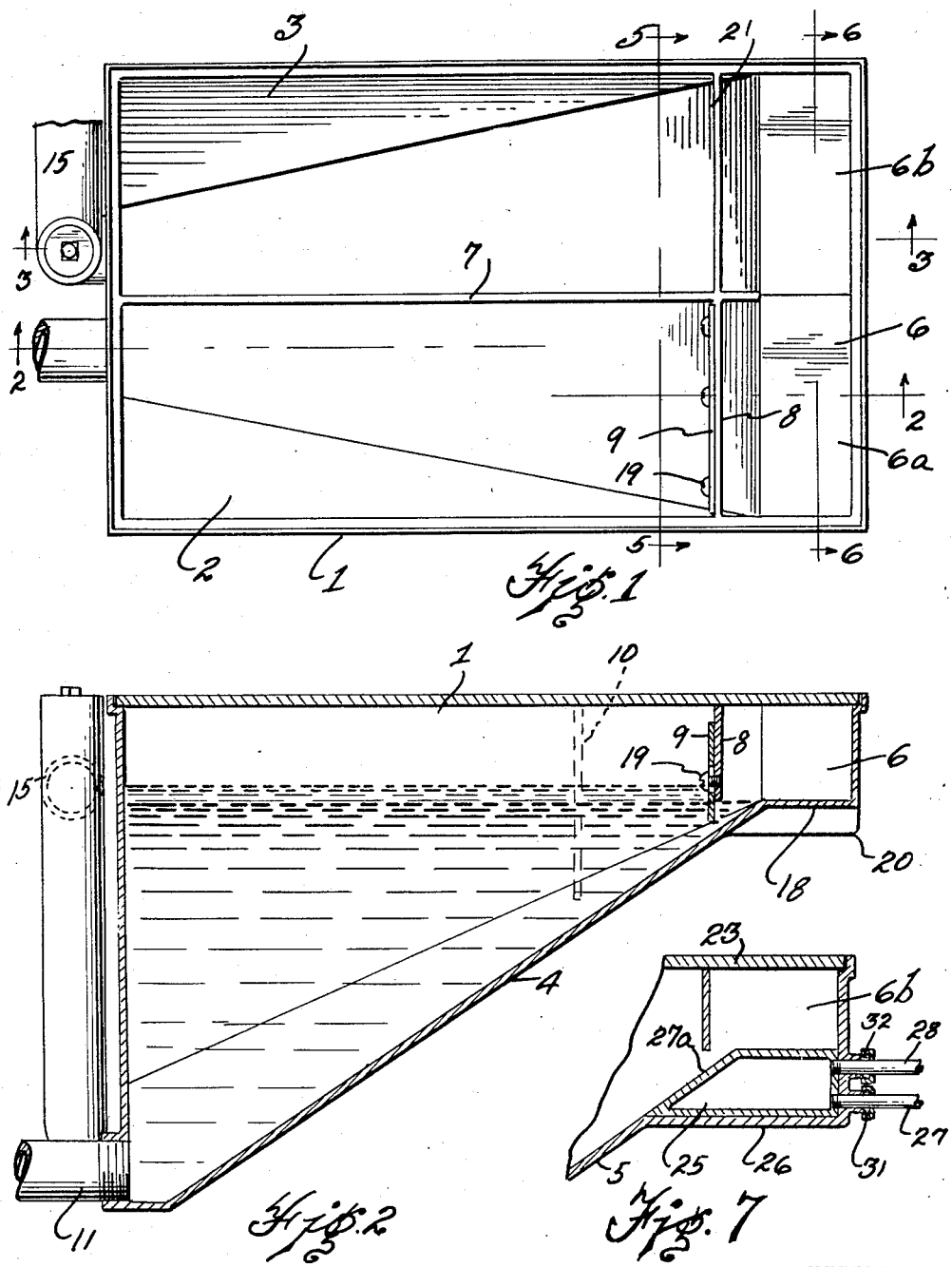
INVENTOR.
EDWARD W. N. BOOSEY
BY
ATTORNEY.

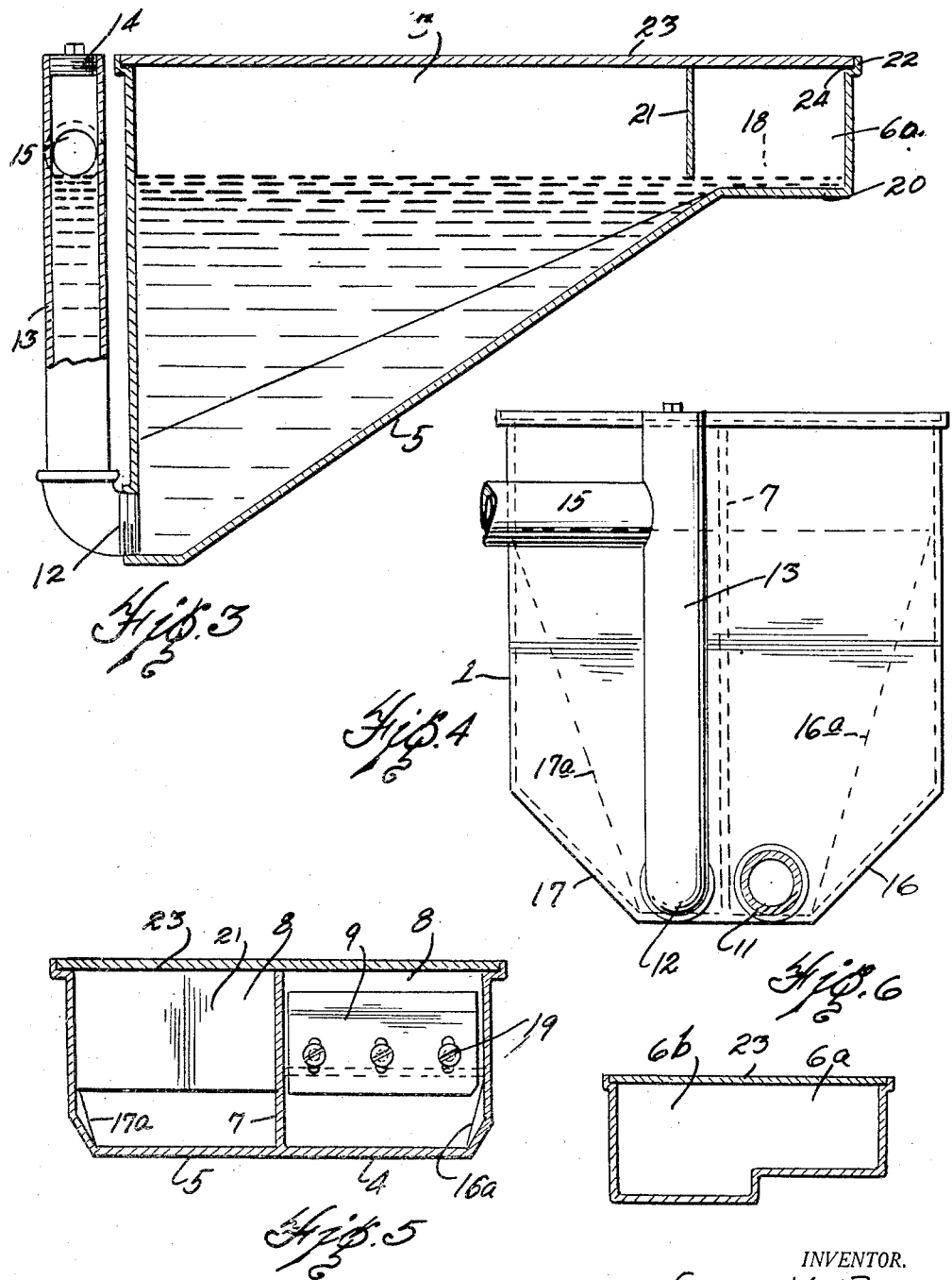

Patented Apr. 21, 1931

1,801,262

UNITED STATES PATENT OFFICE

EDWARD W. N. BOOSEY, OF DETROIT, MICHIGAN

GREASE TRAP

Application filed September 25, 1929. Serial No. 395,021.

This invention relates to grease traps, the object being to provide a trap for use in a drainage system in which grease, oils and similar matter may be separated from the fluid flowing thereinto from drainage lines of various characters, kitchen sinks etc., and thus prevent the fats from passing into the drainage system and clogging the same from which it is difficult of removal.

A further object and purpose of the invention is to provide a trap for greases, oils, etc., in which the fats are separated from the waste water from whatever source and clogged within the trap and held from passing therethrough to the drainage lines connected with the sewer.

It is further a purpose and object of the invention to provide a simplified construction for this purpose of a character to prevent overloading of the trap with grease and arranged to prevent the suction at the outlet from drawing grease form the trap.

A further purpose and object of the invention is to provide a grease trap adapted to be installed in a drain line through which waste water containing fats is ordinarily discharged, separate the fats from the waste water and discharge the water practically purified to the waste line connected with the sewer and the provision in conjunction therewith of a congealing chamber wherein the fat content is solidified at a point to cause a stoppage of flow through the trap.

In previous devices of this character it is quite common to find the water passing from the outlet of the trap still containing considerable grease even though part of the grease is retained within the trap. This difficulty arises through there being no complete stoppage of flow by reason of coagulation of grease in the trap and by reason of an accumulation of grease at such point that it is drawn into the outlet. A feature of this invention resides in the provision of the above mentioned congealing chamber of small capacity and surface area through which the drainage liquid is passed subsequent to its passing through a separating chamber in which the major portion of the grease may have been separated and from which it passes to an outlet chamber in which the liquid level is maintained at a sufficient distance above the outlet as to be practically free from the influence of the suction.

Thus, by the provision of an intermediate chamber of small capacity and surface area grease that may not have had opportunity to separate from the fluid in the inlet or separating chamber is caused to accumulate at a point in which the fluid is more or less quiescent and free from eddy currents to which the separating chamber is more or less subject.

A further object and feature of the invention is in the provision of a separating chamber to which the liquid is first introduced at the bottom and which is provided with an upwardly inclined bottom to a secondary or intermediate chamber of shallow depth and thence to an outlet chamber the bottom of which is downwardly inclined to the outlet at the deep end thereof.

These various structural features and other objects and novelties of the invention are hereinafter more fully described and claimed, and a grease trap embodying my invention is shown in preferred form in the accompanying drawings in which—

Fig. 1 is a plan view shown in my improved grease trap.

Fig. 2 is a section taken on line 2—2 of Fig. 1.

Fig. 3 is a section taken on line 3—3 of Fig. 1.

Fig. 4 is an elevation of that end of the trap with which the inlet and outlet conduits are connected.

Fig. 5 is a section taken on line 5—5 of Fig. 1.

Fig. 6 is a section taken on line 6—6 of Fig. 1.

Fig. 7 is a section similar to Fig. 3 showing an alternative form of construction including a cooler by means of which the fluid in the intermediate or congealing chamber may be reduced in temperature to cause coagulation and hardening of the grease.

In its preferred form the device consists of a cast body 1 having two chambers 2 and 3 extending longitudinally thereof, the bottoms 4 and 5 of which are upwardly inclined to a shallow end having a horizontal bottom wall which comprises an intermediate or congealing chamber 6.

The wall 7 extends to said horizontal bottom wall separating the two chambers 2 and 3 and a transverse wall 8 extends from this wall 7 across the upper end of the chamber 2 and is provided with a vertically adjustable plate or slide 9 movable toward or from the inclined bottom member 4 to vary the space between the bottom edge of the member 9 and the bottom wall 4 and constitutes a volume control device. This partition 8 and member 9 may be positioned a greater or less distance from the secondary chamber 6 as may be desired, it being feasible and sometimes desirable to position the same as indicated by the dotted lines 10 in Fig. 2 but the function thereof remains practically the same.

The inlet chamber 2 at the deep end is provided with a threaded aperture and hub to receive the inlet pipe 11 and the outlet chamber 3 is similarly provided as shown in Fig. 3 with a hub to receive the inlet end of an outlet conduit 12. This outlet conduit has a vertical portion 13 which extends upwardly from the inlet and the upper end thereof is threaded to receive a closure plug 14 permitting access to this outlet conduit. Below the closure plug 14 is the outlet proper 15, the height of which determines the level of the water in the outlet chamber and the intermediate or congealing chamber.

Preferably the opposite side walls of the trap are inclined near the bottom as indicated in Fig. 4 at the points 16 and 17 and this incline extends longitudinally of the trap toward the shallow end as indicated by the dotted line $16^a$ and $17^a$ for the respective chambers 2 and 3.

The bottom wall of each chamber from the point $16^a$ or $17^a$ toward the partition 7 is flat and upwardly inclined toward the shallow end, this flat portion being quite narrow in width toward the shallow end as will be understood from Fig. 4.

The volume control device or slide 9 extends across the separating chamber 2 near the shallow end as previously stated but may be spaced at various points back of the horizontal bottom wall 18 of the chamber 6 as previously stated. The function of this volume control device is to redirect the rapidity and volume of flow from the separating chamber 2 into the shallow end of the structure here termed generally the intermediate or congealing chamber. Due to the flow being under a considerable head, the device 9 by adjustment may be set to restrict the volume of flow per unit of time into the intermediate chamber 6 and outlet chamber 3 not in excess of the full capacity of the outlet opening. The plate 9 is adjustable relative to the plate 8 by means of screws 19 which extend through slots in the member 9 into threaded apertures in the member 8 and will be set closer to the bottom 4 under a high head than is necessary when the inlet waters are under a less head or pressure. The bottom wall 18 with which the bottom wall 4 of the chamber 2 terminates determines the normal level of fluid in the chamber 2.

The chamber 6 is formed of two sections $6^a$ having the bottom wall 18 and $6^b$ having the bottom wall 20 which is below the wall 18 as will be understood from Fig. 6. The outlet 15 is at such height that the level of fluid in the chamber 3 is about on the level with the bottom wall 18 of the section $6^a$ of the intermediate chamber 6. Inasmuch as the bottom wall 20 of the section $6^b$ of the chamber 6 is below that of the bottom wall 18 of the section $6^a$ (about one and one-fourth inches in the preferred construction) there is in the neighborhood of an inch or so of fluid in the section $6^b$ while, when no liquid is flowing, the section $6^a$ is practically free of fluid. The congealing chamber specifically is the section $6^b$ of the chamber 6 in which this depth of fluid is maintained. Between this section $6^b$ and the outlet chamber 3 I provide a transverse wall 21 which extends to just below the level of the fluid in the section $6^b$ as indicated in Fig. 3 and thus there is a level of liquid a little above the bottom edge of this wall 21 and grease contained in the water flowing into the section $6^b$ tends to accumulate back of this wall and not much higher than the level of the bottom 18 of the section $6^a$. Accumulation of grease at this point which, as is hereinafter shown is a second point of separation of grease, will very quickly stop the flow from the inlet chamber 2 to the outlet chamber 3 and this stoppage of flow in the drain line will necessitate the opening of the grease trap and removal of the grease therefrom before the trap becomes overloaded with grease and the discharge thereof into the outlet.

The action of the trap is as follows—The waste fluid entering the deep end of the chamber 2 under considerable pressure varying with the head is to some extent deflected upwardly by the inclined wall and to a considerable extent made to take a path upwardly along this inclined wall which is productive of more or less eddy currents in the fluid in the chamber 2. A considerable part of the grease, however, due to the height of the level of the liquid above the inlet, tends to accumulate on the surface of fluid in the chamber 2 and back of the wall 8 and volume control device 9. Such fats, however, as have not been separated are discharged with the waste fluid into the intermediate chamber flowing from the section $6^a$ thereof to the section $6^b$ and thence directly into the outlet chamber through the inlet opening therefor between the transverse wall 21 and the inclined bottom wall 5 of the chamber 3. As the flow ceases there is a back flow of the fluid in the chamber 3 toward and into the section 6ᵇ of the intermediate chamber carrying considerable grease on the surface. In the period intervening between the times waste fluid is discharged into the trap there will be an accumulation of grease on the surface of the fluid in the section 6ᵇ and also in the outlet chamber and as this grease in the section 6ᵇ separates and becomes hardened or coagulated it lies at such level relative to the bottom wall 18 of the intermediate chamber and the bottom edge of the transverse wall 21 that, providing there is sufficient accumulation, an effective stoppage of flow is provided. Thus, the outlet chamber cannot become overloaded with grease to such extent that it will accumulate to a depth sufficient to come within the influence of the discharge of the outlet.

It is to be noted that the entire upper edge of the casing is provided with a recessed end 22 to receive a cover member 23 which is secured thereto as by means of screws and a gasket 24 is provided between the cover and the ledge on which it rests to make the same pressure-tight which is the preferred construction.

An alternative form of construction is shown in Fig. 7 including a cooling element 25 which is merely a hollow chamber the upper surface of which provides the bottom wall for the section 6ᵇ, the upper surface occupying a position similar to the wall 20 of Fig. 3 about one and one-fourth inches below the level of the bottom wall 18 of the section 6ᵃ of the intermediate chamber. The construction of this portion of the section 6ᵇ differs from that previously described by having a bottom wall 26 and the member 25 is simply set into the chamber provided by this bottom wall 26 and is formed with a sloping edge 27ᵃ at the same incline and practically coextensive with the inner surface of the bottom wall 5 of the chamber 3. This member 25 is simply a hollow casting having threaded bosses to receive pipes 28 and 29. These bosses extend outwardly through the vertical wall 30 extending upwardly from the wall 26 and are provided with threaded ends for the packing nuts 31 and 32 to prevent leakage around these pipes. The pipes are connected with a cold water line of a water system or with a refrigerator system whereby cold water or a refrigerator may be circulated through the interior of the member 25.

As the fluid in the section 6ᵇ of the congealing chamber rests on this cooling element at all times waste flowing grease is congealed and readily rises to the surface at this point and practically prevents fluid passing into the outlet chamber as soon as sufficient congealed grease has accumulated to effect such result. The outlet chamber 3 therefore does not become overloaded with grease.

Fluid passes into the chamber 2 through the inlet conduit 11 heretofore mentioned into the deeper end of the chamber and thus it necessarily must flow up the inclined wall 4 and the inclined portion 16 of this chamber 2 tends to cause sediment to flow onto this inclined bottom section 4 and toward the inlet whereby inflowing liquid tends to discharge this sediment over onto the intermediate chamber and thence to the outlet chamber 3 the bottom of which is similarly inclined as heretofore stated tending to cause the sediment to flow by gravity toward the inlet portion 12 of the outlet and thus to pass through the trap. The level of liquid in the chamber 2 as will be noted is a considerable distance above the inlet and the cross sectional area of the chamber at the liquid level is larger than the bottom portion of the chamber. The upper portion of the liquid is therefore less subject to turbulence than the lower portion and thus any greases or oils and the like contained in the fluid in entering the chamber tends to separate and rise to the surface in this chamber 2 for which reason I have termed it a separating chamber and it is prevented from passing over into the section 6ᵃ of the secondary chamber by the volume control device the lower edge of which is below the normal level of the liquid in the separating chamber.

Thus, the fluid passing to the intermediate chamber is to a considerable extent freed of fats and oil and I have provided what I have heretofore termed a congealing chamber (which may be formed with or without the cooling element heretofore described) to cause a quick stoppage of flow through a comparatively small accumulation of grease. This stoppage, however, is not so often in time period to require very frequent cleaning of the trap because this quick stoppage of flow takes place with fluid that has been to a considerable extent freed of grease content before it reaches this point of congealing. The trap will contain a large amount of grease at those times the flow is stopped by an accumulation in the congealing portion of the intermediate chamber and necessity for removal is not occasioned so often as to make the operation burdensome.

It is also to be noted that due to the arrangement of the outlet a considerable distance below the level of the fluid in the chamber 3 any greases passing through the congealing chamber may rise to the surface in the chamber 3 which is practically quiescent and, in the construction shown in Fig. 7 in which the cooling element has an end portion forming part of the bottom wall of the chamber 3 over which the fluid flows from the section 6ᵇ into the chamber 3, fats in such fluid passing over into the chamber 3 would be congealed and naturally pass out of the line of flow of fluid to the outlet which is along the bottom wall 5 of the chamber 3.

From the foregoing description it will be evident that the device is of very simple construction it being preferably a casting formed with a removable cover to be secured in sealed relation therewith and formed with the several chambers described providing a separating chamber, an intermediate chamber and an outlet chamber in which a final separation of the greases and oils may take place and once installed there are no parts to be further adjusted or removed for cleaning purposes and thus a simplified structure is secured of comparatively low cost and which can be made in various sizes for use of households as well as industrial plants of various kinds in which the waste water containing fats and oils and in which there is provided a means for preventing overloading of the trap with grease and thus the passage of fats and oils to the drain line and to the sewer connected therewith (not here shown) is prevented.

It will be further observed that the various objects of the invention are attained by the construction shown and described and that the invention is not confined to the described arrangement of chambers as any arrangement of inlet and outlet chambers relative to an intermediate chamber productive of the described resultant grease separation is contemplated by the appended claims.

Having thus fully described my invention, what I claim is—

1. A grease trap comprising a hollow casing, a removable cover member adapted to be secured in sealed relation therewith, the said casing being provided with a longitudinal and a transverse partition separating the same into two parallel chambers and a third or intermediate chamber extending across the end of the other two chambers, an inlet conduit at the bottom end of one chamber and an outlet conduit having its inlet at the bottom end of the other chamber, the bottom walls of the two parallel chambers being upwardly inclined from the inlet and outlet respectively toward the opposite end to beyond the transverse partition, a horizontal bottom wall at the said end of the casing with which the upwardly inclined walls of the respective inlet and outlet chambers coincide, the transverse partition across the outlet chamber being spaced from the inclined bottom wall thereof and the outlet conduit being arranged to maintain a depth of fluid therein above the bottom edge of the transverse partition and above the said horizontal bottom wall, and the transverse partition near the shallow end of the inlet chamber being adapted to restrict the volume of flow per unit of time from the inlet chamber to the chamber at the shallow end of the casing.

2. A grease trap comprising a hollow casing; a cover therefor adapted to be secured in sealed relation therewith, a longitudinal partition extending across the casing terminating at a distance from one end, an inlet conduit at one end and bottom of the one chamber, an outlet conduit having an inlet opening at the same end and bottom of the other chamber, the bottom wall of the two chambers sloping upwardly toward the opposite end of the casing and said opposite end having a horizontal bottom wall extending to the upwardly inclined bottoms of the chambers, a transverse partition extending across the two chambers, the bottom edge of which is in spaced relation with the inclined bottoms of the chambers near their point of junction with the horizontal bottom wall at the shallow end of the casing, an adjustable plate on that portion of the partition in the inlet chamber adjustable toward or from the bottom wall of the chamber providing a volume control and the bottom edge of the partition in the outlet chamber extending to below the normal level of fluid therein, the outlet conduit being arranged to maintain a level of liquid in the outlet chamber above the horizontal bottom wall at the shallow end thereof.

3. A grease trap comprising a casing formed of two chambers each being of greatest depth at the same end and sloping upwardly toward the opposite end, a transverse partition extending across each of the chambers near the opposite end, said opposite end having a horizontal bottom providing a chamber of shallow depth open to both the first named chambers, the transverse partitions of the said chambers being positioned above the inclined bottoms and spaced therefrom, an adjustable plate on the said transverse wall in one chamber extending thereacross whereby the space between said transverse wall and the inclined bottom of the said chamber may be varied, an inlet conduit opening into the deep end of the said chamber, and an outlet at the deep end of the other of said chambers.

4. A grease trap comprising a hollow casing of rectangular form at the upper end and toward the bottom end having the side walls thereof inclined inwardly and the bottom wall inclined upwardly from one end toward the opposite end and terminating in a horizontal bottom wall extending to said end of the casing, a partition extending longitudinally thereacross to the horizontal bottom wall and separating the same into two main chambers, a transverse wall extending across the casing near the shallow end providing an intermediate chamber of shallow depth, an inlet conduit at the deep end of one chamber and an outlet conduit having an inlet opening at the deep end of the other longitudinal chamber, the outlet conduit being arranged to maintain a level of fluid in the outlet chamber at a point above the horizontal bottom wall at the shallow end thereof, the transverse partition being spaced from the inclined bottom walls of both main chambers providing for movement of fluid from the inlet chamber through the intermediate chamber to the outlet chamber, and means for varying the area of the opening providing for flow from the inlet chamber to the intermediate chamber.

5. In a grease trap, a hollow casing having a longitudinal partition therein and an upwardly inclined bottom wall from one end toward the opposite end terminating in a horizontal bottom wall at the opposite end of the casing, an inlet conduit at the deeper end and bottom of one chamber and an outlet conduit having an inlet opening at the deeper end and bottom of the other chamber, the partition terminating at the horizontal bottom wall at the shallow end of the casing, a transverse partition extending across the two chambers near the shallow end having a bottom edge in spaced relation with the inclined bottom walls of the respective chambers, the transverse partition in the outlet chamber being spaced from the inclined bottom wall thereof and the outlet conduit being arranged to maintain a level of fluid above the said bottom edge of the said transverse wall and horizontal bottom wall at the end of the casing, the horizontal bottom wall at the end of the inlet chamber being above that at the end of the outlet chamber and the transverse partition extending thereacross being provided with means to vary the area of the opening between the bottom edge of the partition and the inclined bottom wall of the inlet chamber.

6. In a grease trap, a hollow casing having a longitudinal and transverse partition therein forming two parallel chambers and a third or intermediate chamber across the end of the two parallel chambers, the bottom wall of the parallel chambers being upwardly inclined from one end toward the other terminating in a horizontal bottom wall at the end of each chamber beyond the transverse partition forming the bottom of the intermediate chamber, an inlet conduit at the bottom of the deeper end of one of the parallel chambers and an outlet conduit having an inlet at the bottom of the deeper end of the other parallel chamber, the transverse partition in the outlet chamber being spaced from the inclined bottom wall thereof providing an outlet for the intermediate chamber, the outlet conduit being arranged to maintain a level of liquid above the bottom edge of the transverse partition in the outlet chamber and the said horizontal bottom wall of the intermediate chamber, and means for varying the volume of flow per unit of time from the inlet chamber to the intermediate chamber.

7. In a grease trap, a casing arranged to form two main chambers each having an upwardly inclined bottom wall from one end toward the other and an intermediate chamber therebetween having a practically horizontal bottom wall at which the respective inclined walls terminate, an inlet for one of the chambers at the deep end and an outlet opening at the deep end of the other chamber, a flow control device by which the volume of flow per unit of time from the inlet chamber to the intermediate chamber may be controlled, a partition extending across the outlet chamber in spaced relation with the inclined bottom wall near the point of junction with the horizontal bottom wall of the intermediate chamber, and an outlet conduit connected with the said outlet opening arranged to maintain a level of fluid in the outlet chamber above the bottom edge of the said transverse partition.

8. In a grease trap, a casing having two main chambers, the bottom walls of which are upwardly inclined from one end toward the other and an intermediate chamber having a horizontal bottom wall with which the inclined walls of the two main chambers respectively terminate, an inlet conduit at the bottom and deep end of the one chamber and an outlet opening at the bottom and deep end of the other chamber, the portion of the horizontal bottom wall of the intermediate chamber with which the inclined bottom wall of the outlet chamber terminates being below the level of that portion of the horizontal bottom wall with which the inclined bottom wall of the inlet chamber terminates, a transverse wall extending across the inlet chamber near the junction of the bottom wall thereof with the horizontal bottom of the intermediate chamber, adjustable means thereon for varying the area of the opening between the transverse wall and inclined bottom wall providing a means to control the volume of flow per unit of time from the inlet chamber to the intermediate chamber, a transverse wall extending across the outlet chamber in spaced relation with the inclined bottom wall thereof near its point of junction with the lower portion of the horizontal bottom wall of the intermedate chamber, and an outlet conduit connected with said outlet opening of the outlet chamber arranged to maintain a level of fluid in the outlet chamber and the intermediate chamber practically on a level with the higher bottom wall of the intermediate chamber and above the lower edge of the transverse wall of the outlet chamber.

9. In a grease trap, a hollow casing having an open upper end, a removable cover in sealable relation therewith, the interior thereof being partitioned into two parallel chambers and a third or intermediate chamber across the end of the two parallel chambers, the intermediate chamber being of shallow depth and the other of said chambers increasing in depth therefrom to the opposite end of the casing, an inlet conduit at the deep end of the one chamber and an outlet conduit having an opening at the deep end of the other chamber, the partition forming a side wall of the intermediate chamber being spaced from the bottom walls of the respective inlet and outlet chambers whereby fluid may flow from the inlet chamber into the intermediate chamber and from the intermediate chamber to the outlet chamber, the outlet conduit being arranged to maintain a level of liquid in the outlet chamber above the transverse partition forming the side wall of the intermediate chamber, and a cooling element over which the fluid must pass in flowing to the outlet chamber.

10. In a grease trap, a hollow casing having a longitudinal partition providing two parallel chambers and a transverse partition extending across the ends thereof, the bottom walls of the parallel chambers being upwardly inclined and extending to beyond the transverse partition, an inlet conduit for one of the chambers and an outlet conduit for the other at the deeper end of the casing, the transverse partition being spaced to provide for a flow of fluid from the inlet chamber to the transverse chamber and thence to the outlet chamber, and means for cooling the fluid before it passes to the outlet chamber.

11. In a grease trap, a hollow casing having an inlet chamber, an inlet conduit therefor, a second chamber of shallow depth to which the material flows from the inlet chamber, said second chamber having an outlet positioned to be closed by congealed fats on the surface of the fluid therein, and means for cooling the fluid in the second chamber.

12. In a grease trap, a hollow casing having an inlet chamber to which fluid first flows and in which the fats are partially separated from the liquid, a second chamber to which the fluid and the remaining portions of the fats flow from the inlet chamber, an outlet for the second chamber, said second chamber having an outlet positioned to be closed by congealed fats on the surface of the fluid therein, and a cooling element therein providing a means to congeal the remaining fats in the liquid and close the outlet.

13. In a grease trap for drainage systems, a hollow casing having a separating chamber into which the fluid first flows and in which a portion of the fats rise to the surface, a second chamber to which fluid may flow from the first chamber, said second chamber having an outlet positioned to be closed by congealed fats on the surface of the fluid therein, a partition in the separating chamber extending to below the level of fluid therein, said second chamber being shallow in depth and having an outlet, a cooling element adjacent the outlet providing a means to congeal the fats in the liquid in the second chamber causing them to rise to the surface over the outlet.

14. In a grease trap, a casing having a chamber, an inlet conduit therefor, a second chamber therein to which material flows from the inlet chamber, said second chamber being shallow in depth and having an outlet opening consisting of a slot in its wall the upper edge of which is just below the level of fluid therein whereby fats rising to the surface of the fluid in the second chamber will upon sufficient accumulation prevent flow through the outlet.

In testimony whereof, I sign this specification.

EDWARD W. N. BOOSEY.